US008906472B2

(12) United States Patent
Kuriyama et al.

(10) Patent No.: US 8,906,472 B2
(45) Date of Patent: Dec. 9, 2014

(54) NEMATIC LIQUID CRYSTAL COMPOSITION AND LIQUID CRYSTAL DISPLAY ELEMENT USING THE SAME

(75) Inventors: Takeshi Kuriyama, Kitaadachigun (JP); Yoshinori Iwashita, Kitaadachigun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/822,974

(22) PCT Filed: Aug. 16, 2012

(86) PCT No.: PCT/JP2012/070838

§ 371 (c)(1), (2), (4) Date: Jul. 22, 2013

(87) PCT Pub. No.: WO2013/161096

PCT Pub. Date: Oct. 31, 2013

(65) Prior Publication Data

US 2014/0226119 A1 Aug. 14, 2014

(30) Foreign Application Priority Data

Apr. 26, 2012 (JP) ................................ 2012-101083

(51) Int. Cl.

| | |
|---|---|
| ***C09K 19/12*** | (2006.01) |
| ***C09K 19/30*** | (2006.01) |
| ***C09K 19/54*** | (2006.01) |
| ***G02F 1/1333*** | (2006.01) |
| ***C09K 19/44*** | (2006.01) |
| ***C09K 19/06*** | (2006.01) |
| ***C09K 19/56*** | (2006.01) |
| ***G02F 1/133*** | (2006.01) |
| *C09K 19/04* | (2006.01) |

(52) U.S. Cl.

CPC ............. *C09K 19/3003* (2013.01); *C09K 19/44* (2013.01); *C09K 19/062* (2013.01); *C09K 19/56* (2013.01); *G02F 1/133* (2013.01); *C09K 2019/0448* (2013.01); *C09K 2019/122* (2013.01); *C09K 2019/123* (2013.01); *C09K 2019/3004* (2013.01); *C09K 2019/301* (2013.01); *C09K 2019/3016* (2013.01); *C09K 2019/3009* (2013.01)

USPC .................... 428/1.1; 252/299.5; 252/299.63; 252/299.66; 349/186

(58) Field of Classification Search

CPC ........ C09K 19/12; C09K 19/38; C09K 19/44; C09K 2019/123; C09K 2019/0448; C09K 2019/54; C09K 2019/548; C09K 2019/122; C09K 2019/3004; C09K 2019/301; C09K 2019/3016; G02F 1/1333

USPC .............. 252/299.5, 299.66, 299.63; 428/1.1; 349/186

See application file for complete search history.

(56) References Cited

U.S. PATENT DOCUMENTS

| | | | | |
|---|---|---|---|---|
| 6,051,288 | A | 4/2000 | Kondo et al. | |
| 6,444,278 | B1 | 9/2002 | Reiffenrath et al. | |
| 7,872,719 | B2 | 1/2011 | Hanaoka et al. | |
| 8,399,073 | B2 * | 3/2013 | Klasen-Memmer et al. | 428/1.1 |
| 2003/0048401 | A1 | 3/2003 | Hanaoka et al. | |
| 2003/0197153 | A1 | 10/2003 | Heckmeier et al. | |
| 2003/0222245 | A1 | 12/2003 | Klasen-Memmer et al. | |
| 2005/0146664 | A1 | 7/2005 | Hanaoka et al. | |
| 2008/0121843 | A1 | 5/2008 | Heckmeier et al. | |
| 2009/0090892 | A1 | 4/2009 | Fujita et al. | |
| 2009/0103011 | A1 | 4/2009 | Bernatz et al. | |
| 2009/0206300 | A1 | 8/2009 | Satou et al. | |
| 2009/0324853 | A1 | 12/2009 | Bernatz et al. | |
| 2011/0063553 | A1 | 3/2011 | Hanaoka et al. | |
| 2011/0101270 | A1 | 5/2011 | Manabe et al. | |
| 2011/0248216 | A1 * | 10/2011 | Klasen-Memmer et al. | 252/299.62 |

FOREIGN PATENT DOCUMENTS

| | | | |
|---|---|---|---|
| CN | 1184462 | A | 6/1998 |
| CN | 1412274 | A | 4/2003 |
| CN | 101356251 | A | 1/2009 |
| CN | 101418220 | A | 4/2009 |
| CN | 102015963 | A | 4/2011 |
| DE | 10117224 | A1 | 2/2002 |
| DE | 102008064171 | * | 7/2010 |
| JP | 6-235925 | A | 8/1994 |
| JP | 9-124529 | A | 5/1997 |

(Continued)

OTHER PUBLICATIONS

International Search Report of PCT/JP2012/070838 dated Oct. 2, 2012, with forms PCT/ISA/220 and PCT/ISA/237. (with Partial English translation).

(Continued)

*Primary Examiner* — Shean C Wu

(74) *Attorney, Agent, or Firm* — Westerman, Hattori, Daniels & Adrian, LLP

(57) ABSTRACT

The nematic liquid crystal composition exhibits a negative dielectric anisotropy (Δ∈), the liquid crystal composition being useful as a liquid crystal display material, and a liquid crystal display element using the same. The liquid crystal composition of the present invention has a large absolute value of the dielectric anisotropy thereof and a low viscosity. By using this liquid crystal composition, it is possible to provide a liquid crystal display element which has a high contrast, high-speed responsiveness, and good display quality in which image sticking and display defects are not generated. The liquid crystal display element using the liquid crystal composition is a useful display element which realizes both high-speed response and suppression of display defects. In particular, the liquid crystal display element is useful as a liquid crystal display element for active-matrix driving, and can be applied to, for example, a VA-type or PSVA-type liquid crystal display element.

8 Claims, No Drawings

(56) References Cited

FOREIGN PATENT DOCUMENTS

| | | | |
|---|---|---|---|
| JP | 2002-357830 | A | 12/2002 |
| JP | 2003-327965 | A | 11/2003 |
| JP | 2006-169472 | A | 6/2006 |
| TW | 200927892 | A | 7/2009 |
| WO | 2007/077872 | A1 | 7/2007 |

OTHER PUBLICATIONS

Office Action dated Apr. 3, 2014, issued in Corresponding Chinese Patent Application No. 201280003458.1 (9 pages).

Office Action dated Dec. 16, 2013, issued in Corresponding Taiwanese Patent Application No. 101130192 (4 pages).

* cited by examiner

NEMATIC LIQUID CRYSTAL COMPOSITION AND LIQUID CRYSTAL DISPLAY ELEMENT USING THE SAME

TECHNICAL FIELD

The present invention relates to a nematic liquid crystal composition that exhibits a negative dielectric anisotropy (Δ∈), the liquid crystal composition being useful as a liquid crystal display material, and a liquid crystal display element using the same.

BACKGROUND ART

Liquid crystal display elements are used in not only watches and electronic calculators, but also various measuring instruments, panels for automobiles, word processors, electronic notebooks, printers, computers, televisions, clocks, advertisement display boards, etc. Typical examples of a liquid crystal display system include a twisted nematic (TN)-type display, a super-twisted nematic (STN)-type display, a vertical alignment (VA)-type display using a thin-film transistor (TFT), and an in-plane-switching (IPS)-type display. It is desired that liquid crystal compositions used in these liquid crystal display elements be stable against external factors such as moisture, air, heat, and light, exhibit a liquid crystal phase in as wide a temperature range as possible with room temperature being at the center of the range, have low viscosities, and have low drive voltages. Furthermore, the liquid crystal compositions each contain several types to several tens of types of compounds for the purpose of optimizing, for example, dielectric anisotropy (Δ∈) and/or birefringence (Δn) for respective display elements.

In vertical alignment displays, liquid crystal compositions having a negative Δ∈ are used, and such displays are widely used in liquid-crystal display televisions and the like. In all driving systems, low-voltage driving, high-speed response, and a wide operating temperature range have been desired. Specifically, a large absolute value of Δ∈, a low viscosity (η), and a high nematic phase-isotropic liquid phase transition temperature ($T_{ni}$) have been desired. Furthermore, it is necessary to control the Δn of a liquid crystal composition to be in an appropriate range in accordance with a cell gap on the basis of a value of Δn×d, which is the product of the Δn and the cell gap (d). In addition, in the case where a liquid crystal display element is applied to a television or the like, high-speed responsiveness is important and thus a liquid crystal composition having a small rotational viscosity $\gamma_1$ is required. In particular, recently, in order to reduce the cell gap for realizing high-speed response, it has been necessary to increase the Δn in addition to the decrease in the viscosity. For this purpose, PTL 1 and PTL 2 disclose a liquid crystal composition containing a compound having a terphenyl structure substituted with a fluorine atom.

In order to practically use a liquid crystal composition in a liquid crystal display element, it is necessary that no problem occur in terms of display quality. In particular, a liquid crystal composition used in an active-matrix driving liquid crystal display element that is driven by TFT elements or the like needs to have a high specific resistance or a high voltage holding ratio. In addition, it is also necessary for such a liquid crystal composition to be stable against external stimuli such as light and heat. To meet this requirement, antioxidants for improving stability against heat and liquid crystal compositions containing the antioxidants have been disclosed (refer to PTL 3 and PTL 4). However, the stability is not necessarily sufficient. In particular, liquid crystal compounds having a large Δn have relatively low stability against light and heat, and thus such a composition does not have sufficient quality stability.

Furthermore, with the increasing number of applications for liquid crystal display elements, methods of using the liquid crystal display elements and methods of producing the liquid crystal display elements have also been significantly changed. In order to catch up with these changes, it has been desired to optimize properties other than known basic physical property values. Specifically, regarding liquid crystal display elements that use liquid crystal compositions, vertical alignment (VA)-type liquid crystal display elements, in-plane-switching (IPS)-type liquid crystal display elements, and the like have been widely used, and very large display elements having a 50-inch or larger display size have been practically used. Regarding a method for injecting a liquid crystal composition into a substrate, with the increase in the size of substrates, a one-drop-fill (ODF) method has been mainly used instead of an existing vacuum injection method (refer to PTL 5). However, it has been found that a drop mark formed when a liquid crystal composition is dropped on a substrate results in a problem of a decrease in the display quality. In order to form a pre-tilt angle of a liquid crystal material in a liquid crystal display element and to realize high-speed responsiveness, polymer-stabilized (PS) liquid crystal display elements and polymer-sustained alignment (PSA) liquid crystal display elements have been developed (refer to PTL 6). However, the problem of a drop mark has become a significant problem. These display elements are characterized in that a monomer is added to a liquid crystal composition and that the monomer in the composition is cured. In many cases, the monomer is cured by irradiating the composition with ultraviolet light. Therefore, in the case where a component having low stability against light is added to the liquid crystal composition, the specific resistance or the voltage holding ratio is decreased, and in some cases, the generation of a drop mark may also be induced, resulting in a problem of a decrease in the yield of the liquid crystal display element due to display defects.

Accordingly, it has been desired to develop a liquid crystal display element which has high stability against light, heat, etc. and in which display defects such as image sticking and a drop mark do not tend to occur while maintaining characteristics and performance, such as high-speed responsiveness, which are desired for the liquid crystal display element.

CITATION LIST

Patent Literature

PTL 1: Japanese Unexamined Patent Application Publication No. 2003-327965
PTL 2: International Publication No. WO2007/077872
PTL 3: Japanese Unexamined Patent Application Publication No. 9-124529
PTL 4: Japanese Unexamined Patent Application Publication No. 2006-169472
PTL 5: Japanese Unexamined Patent Application Publication No. 6-235925
PTL 6: Japanese Unexamined Patent Application Publication No. 2002-357830

SUMMARY OF INVENTION

Technical Problem

An object of the present invention is to provide a liquid crystal composition having a negative dielectric anisotropy ($\Delta\epsilon$), the liquid crystal composition having a liquid crystal phase over a wide temperature range, a low viscosity, good solubility at low temperatures, a high specific resistance, and a high voltage holding ratio, and being stable against heat and light. Another object of the present invention is to provide, by using the liquid crystal composition, for example, a VA-type or polymer-stabilized vertical alignment (PSVA)-type liquid crystal display element which has high display quality and in which display defects such as image sticking and a drop mark do not tend to occur.

Solution to Problem

The inventor of the present invention studied various liquid crystal compounds and various chemical substances and found that the objects can be achieved by combining specific compounds. This finding led to the completion of the present invention.

The present invention provides a nematic liquid crystal composition containing, as a first component, at least one compound represented by general formula (I):

[Chem. 1]

(I)

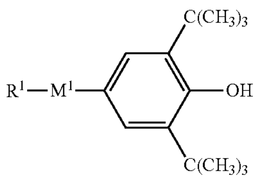

(where $R^2$ represents a linear or branched alkyl group having 1 to 22 carbon atoms and at least one $CH_2$ group in the alkyl group may be substituted with —O—, —CH═CH—, —CO—, —OCO—, —COO—, —C≡C—, —$CF_2$O—, or —$OCF_2$— so that oxygen atoms are not directly adjacent to each other; and $M^2$ represents a trans-1,4-cyclohexylene group, a 1,4-phenylene group, or a single bond), and as a second component, at least one compound selected from the group consisting of compounds represented by general formula (II):

[Chem. 2]

(II)

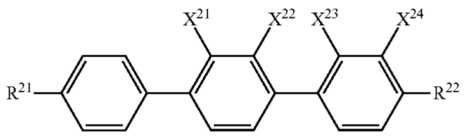

(where $R^{21}$ and $R^{22}$ each independently represent an alkyl group having 1 to 10 carbon atoms or an alkenyl group having 2 to 10 carbon atoms and $X^{21}$ to $X^{24}$ each independently represent a hydrogen atom or a fluorine atom), wherein a dielectric anisotropy ($\Delta\epsilon$) at 25° C. is −2.0 or less. Furthermore, the present invention provides a liquid crystal display element using the liquid crystal composition.

Advantageous Effects of Invention

According to the liquid crystal composition of the present invention, the liquid crystal composition having a negative $\Delta\epsilon$, a significantly low viscosity can be achieved, solubility at low temperatures is good, and changes in the specific resistance and the voltage holding ratio due to heat and light are extremely small, and thus products obtained by using the liquid crystal composition can be widely practically used. Liquid crystal display elements, such as VA-type and PSVA-type liquid crystal display elements, using the liquid crystal composition are very useful because high-speed response can be achieved and display defects are suppressed.

DESCRIPTION OF EMBODIMENTS

In a liquid crystal composition of the present invention, in a compound used as a first component and represented by general formula (I):

[Chem. 3]

(I)

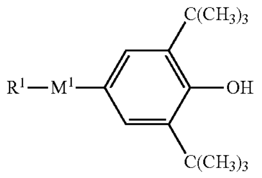

$R^1$ represents a linear or branched alkyl group having 1 to 22 carbon atoms and at least one $CH_2$ group in the alkyl group may be substituted with —O—, —CH═CH—, —CO—, —OCO—, —COO—, —C≡C—, —$CF_2$O—, or —$OCF_2$— so that oxygen atoms are not directly adjacent to each other. Examples of $R^1$ preferably include a linear alkyl group, a linear alkoxy group, a linear alkyl group in which one $CH_2$ group is substituted with —OCO— or —COO—, a branched alkyl group, a branched alkoxy group, and a branched alkyl group in which one $CH_2$ group is substituted with —OCO— or —COO—, all of which have 1 to 10 carbon atoms. Examples of $R^1$ more preferably include a linear alkyl group, a linear alkyl group in which one $CH_2$ group is substituted with —OCO— or —COO—, a branched alkyl group, a branched alkoxy group, and a branched alkyl group in which one $CH_2$ group is substituted with —OCO— or —COO—, all of which have 1 to 20 carbon atoms. $M^1$ represents a trans-1,4-cyclohexylene group, a 1,4-phenylene group, or a single bond. $M^1$ is preferably a trans-1,4-cyclohexylene group or a 1,4-phenylene group.

More specifically, the compound represented by general formula (I) is preferably a compound selected from compounds represented by general formulae (I-a) to (I-d) below.

[Chem. 4]

(I-a)

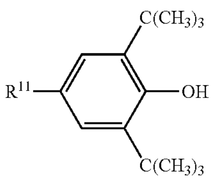

-continued (I-b)

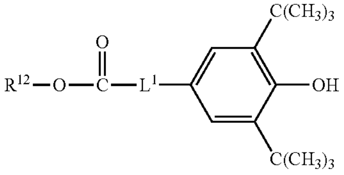

(I-c)

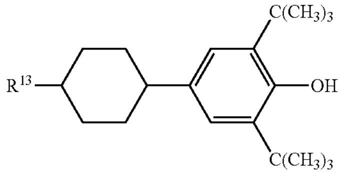

(I-d)

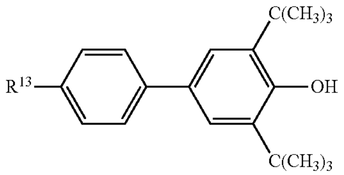

In the above formulae, $R^{11}$ is preferably a linear alkyl group or branched alkyl group having 1 to 10 carbon atoms; $R^{12}$ is preferably a linear alkyl group or branched alkyl group having 1 to 20 carbon atoms, $R^{13}$ is preferably a linear alkyl group, branched alkyl group, linear alkoxy group, or branched alkoxy group having 1 to 8 carbon atoms; and $L^1$ is preferably a linear alkylene group or branched alkylene group having 1 to 8 carbon atoms. Among the compounds represented by general formulae (I-a) to (I-d), the compounds represented by general formulae (I-c) and (I-d) are more preferable.

The liquid crystal composition of the present invention preferably contains one or two compounds represented by general formula (I), and more preferably contains one to five compounds represented by general formula (I). The content thereof is preferably 0.001% to 1% by mass, more preferably 0.001% to 0.1% by mass, and particularly preferably 0.001% to 0.05% by mass.

In the compound used as a second component and represented by general formula (II):

[Chem. 5]

(II)

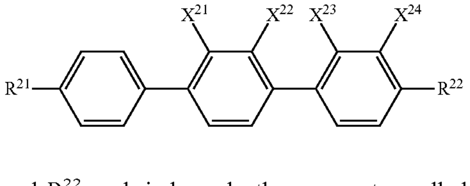

$R^{21}$ and $R^{22}$ each independently represent an alkyl group having 1 to 10 carbon atoms or an alkenyl group having 2 to 10 carbon atoms and $X^{21}$ to $X^{24}$ each independently represent a hydrogen atom or a fluorine atom. At least one of $X^{21}$ to $X^{24}$ is preferably a fluorine atom.

More specifically, the compound represented by general formula (II) is preferably a compound selected from compounds represented by general formulae (II-a) to (II-f) below:

[Chem. 6]

(II-a)

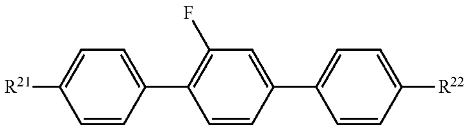

(II-b)

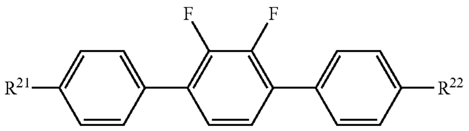

(II-c)

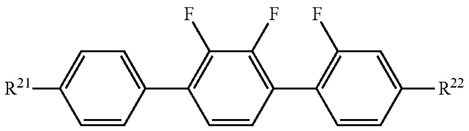

(II-d)

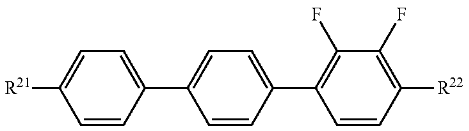

(II-e)

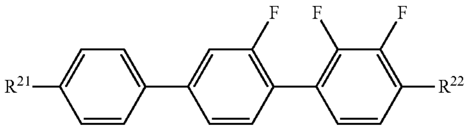

(II-f)

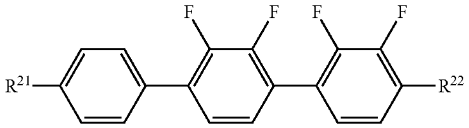

(where $R^{21}$ and $R^{22}$ each independently represent an alkyl group having 1 to 10 carbon atoms or an alkenyl group having 2 to 10 carbon atoms.)

Among the compounds represented by general formulae (II-a) to (II-f), compounds represented by general formulae (II-a), (II-b), and (II-d) are more preferable.

In the present invention, at least one compound represented by general formula (II) is contained. One to ten compounds represented by general formula (II) are preferably contained, and one to five compounds represented by general formula (II) are particularly preferably contained. The content thereof is preferably 5% to 30% by mass, and more preferably 5% to 20% by mass.

The liquid crystal composition of the present invention may further contain, as a third component, at least one compound represented by general formula (III):

[Chem. 7]

(III)

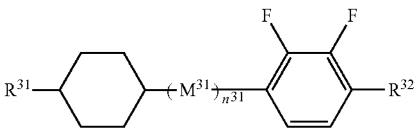

In the compound represented by general formula (III), $R^{31}$ and $R^{32}$ each independently represent an alkyl group or alkoxy group having 1 to 10 carbon atoms, or an alkenyl group having 2 to 10 carbon atoms. $M^{31}$ is preferably a trans-1,4-cyclohexylene group or a 1,4-phenylene group, and $n^{31}$ represents 0 or 1.

In the present invention, at least one compound represented by general formula (III) may be contained. One to ten compounds represented by general formula (III) are preferably contained, and one to eight compounds represented by general formula (III) are particularly preferably contained. The content thereof is preferably 5% to 50% by mass, and more preferably 5% to 30% by mass.

The liquid crystal composition of the present invention may further contain at least one compound selected from the compound group represented by general formulae (IV-a) to (IV-d):

[Chem. 8]

(IV-a)

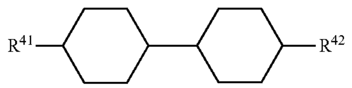

(IV-b)

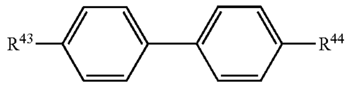

(IV-c)

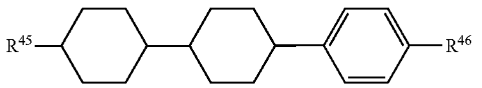

(IV-d)

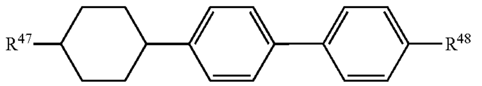

(where $R^{41}$ to $R^{48}$ each independently represent an alkyl group or alkoxy group having 1 to 10 carbon atoms, or an alkenyl group having 2 to 10 carbon atoms).

In the present invention, at least one compound selected from the compound group represented by general formulae (IV-a) to (IV-d) may be contained. One to ten compounds selected from the compound group are preferably contained, and one to eight compounds selected from the compound group are particularly preferably contained. The content thereof is preferably 5% to 80% by mass, more preferably 10% to 70% by mass, and particularly preferably 20% to 60% by mass.

The liquid crystal composition of the present invention has a dielectric anisotropy ($\Delta\epsilon$) of −2.0 to −6.0 at 25° C. The $\Delta\epsilon$ is more preferably −2.0 to −5.5 at 25° C. The liquid crystal composition of the present invention has a birefringence ($\Delta n$) of 0.08 to 0.14 at 25° C. The $\Delta n$ is more preferably 0.09 to 0.13, and particularly preferably 0.09 to 0.12 at 25° C. More specifically, in the case of a small cell gap, the $\Delta n$ is preferably 0.10 to 0.13. In the case of a large cell gap, the $\Delta n$ is preferably 0.08 to 0.10. The liquid crystal composition of the present invention has a viscosity (II) of 10 to 30 mPa·s, more preferably 10 to 25 mPa·s, and particularly preferably 10 to 22 mPa·s at 20° C. The liquid crystal composition of the present invention has a nematic phase-isotropic liquid phase transition temperature ($T_{ni}$) of 60° C. to 120° C., more preferably 70° C. to 100° C., and particularly preferably 70° C. to 85° C.

The liquid crystal composition of the present invention may contain a common nematic liquid crystal, smectic liquid crystal, cholesteric liquid crystal, polymerizable monomer, and the like in addition to the above compounds.

The liquid crystal composition of the present invention may contain a polymerizable compound in order to produce a liquid crystal display element such as a PS mode-, PSA mode-, or PSVA-mode liquid crystal display element. Examples of the polymerizable compound include photopolymerizable monomers that are polymerized by energy rays such as light. In terms of the structure, examples thereof include polymerizable compounds having a liquid crystal skeleton in which plural six-membered rings are linked to each other, for example, biphenyl derivatives and terphenyl derivatives. More specifically, a preferable polymerizable compound is a bifunctional monomer represented by general formula (V):

[Chem. 9]

(V)

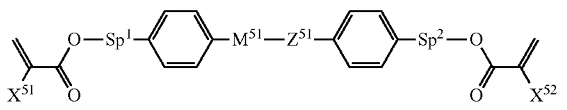

(where $X^{51}$ and $X^{52}$ each independently represent a hydrogen atom or a methyl group;

$Sp^1$ and $Sp^2$ each independently represent a single bond, an alkylene group having 1 to 8 carbon atoms, or $-O-(CH_2)_s-$ (where s represents an integer of 2 to 7 and the oxygen atom is bonded to an aromatic ring);

$Z^{51}$ represents $-OCH_2-$, $-CH_2O-$, $-COO-$, $-COO-$, $-CF_2O-$, $-OCF_2-$, $-CH_2CH_2$, $-CF_2CF_2$, $-CH{=}CH-OCO-$, $-CH{=}CH-OCO-$, $-COO-CH{=}CH-$, $-OCO-CH{=}CH-$, $-COO-CH_2CH_2-$, $-OCO-CH_2CH_2-$, $-CH_2CH_2-COO-$, $-CH_2CH_2-OCO$, $-COO-CH_2$, $-OCO-CH_2$, $-CH_2-COO$, $-CH_2-OCO-$, $-CY^1{=}CY^2-$ (where $Y^1$ and $Y^2$ each independently represent a fluorine atom or a hydrogen atom), $-C{\equiv}C-$, or a single bond; and $M^{51}$ represents a 1,4-phenylene group, a trans-1,4-cyclohexylene group, or a single bond, and any hydrogen atom in all the 1,4-phenylene groups in the formula may be substituted with a fluorine atom.)

Diacrylate derivatives in which each of $X^{51}$ and $X^{52}$ represents a hydrogen atom and dimethacrylate derivatives in which each of $X^{51}$ and $X^{52}$ represents a methyl group are preferable. Compounds in which one of $X^{51}$ and $X^{52}$ represents a hydrogen atom and the other represents a methyl group are also preferable. Regarding the rate of polymerization of these compounds, the rate of polymerization of the diacrylate derivatives is the highest, the rate of polymerization of the dimethacrylate derivatives is the lowest, and the rate of polymerization of the asymmetric compounds is between that of the diacrylate derivatives and that of the dimethacrylate derivatives. Preferable embodiments can be used in accordance with the use of the compound. In a PSA display element, the dimethacrylate derivatives are particularly preferable.

$Sp^1$ and $Sp^2$ each independently represent a single bond, an alkylene group having 1 to 8 carbon atoms, or $-O-(CH_2)_s-$ In a PSA display element, at least one of $Sp^1$ and $Sp^2$ is preferably a single bond. That is, embodiments in which each of $Sp^1$ and $Sp^2$ represents a single bond or embodiments in which one of $Sp^1$ and $Sp^2$ represents a single bond and the other represents an alkylene group having 1 to 8 carbon atoms or $-O-(CH_2)_s-$ are preferable. In such a case, an alkyl group of 1 to 4 is preferable, and s is preferably 1 to 4.

$Z^{51}$ is preferably —$OCH_2$—, —$CH_2O$—, —COO—, —COO—, —$CF_2O$—, —$OCF_2$—, —$CH_2CH_2$—, —$CF_2CF_2$—, or a single bond, more preferably —COO—, —COO—, or a single bond, and particularly preferably a single bond.

$M^{51}$ represents a 1,4-phenylene group in which any hydrogen atom may be substituted with a fluorine atom, a trans-1, 4-cyclohexylene group, or a single bond. $M^{51}$ is preferably a 1,4-phenylene group or a single bond. When C represents a ring structure other than a single bond, $Z^{51}$ may be a linking group other than a single bond. When $M^{51}$ is a single bond, $Z^{51}$ is preferably a single bond.

From the above points, specifically, the ring structure between $Sp^1$ and $Sp^2$ in general formula (V) is preferably selected from the structures described below.

In general formula (V), when $M^{51}$ represents a single bond and the ring structure is formed by two rings, the ring structure represents preferably any one of formulae (Va-1) to (Va-5) below, more preferably any one of formulae (Va-1) to (Va-3), and particularly preferably formula (Va-1).

[Chem. 10]

(Va-1)

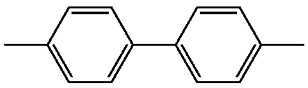

(Va-2)

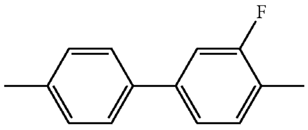

(Va-3)

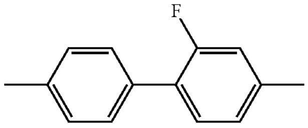

(Va-4)

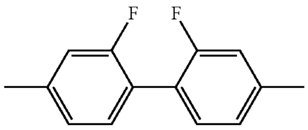

(Va-5)

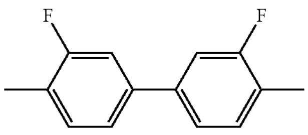

(In the above formulae, both ends are bonded to $Sp^1$ and $Sp^2$.)

Polymerizable compounds having any of these skeletons are most suitably used in PSA-type liquid crystal display elements in terms of alignment control force after polymerization, and thus a good alignment state can be obtained by the polymerizable compounds. Accordingly, display unevenness is suppressed or no display unevenness is generated.

Accordingly, polymerizable monomers represented by general formulae (V-1) to (V-4) are particularly preferable. Among these, the polymerizable monomer represented by general formula (V-2) is the most preferable.

[Chem. 11]

(V-1)

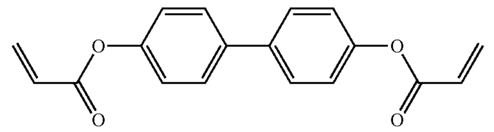

(V-2)

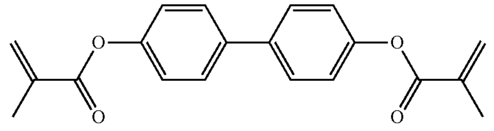

(V-3)

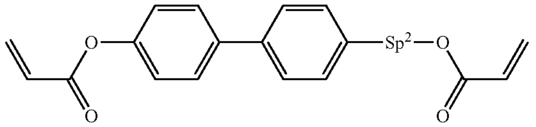

(V-4)

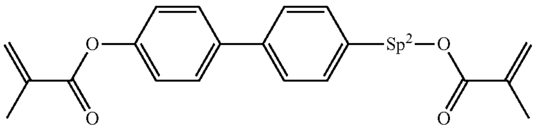

(In the formulae above, $Sp^2$ represents an alkylene group having 2 to 5 carbon atoms.)

In the case where a monomer is added to the liquid crystal composition of the present invention, polymerization proceeds even when no polymerization initiator is present. However, a polymerization initiator may be incorporated in order to accelerate the polymerization. Examples of the polymerization initiator include benzoin ethers, benzophenones, acetophenones, benzyl ketals, and acylphosphine oxides.

To the liquid crystal composition of the present invention, the composition containing a polymerizable compound, a liquid crystal alignment capability is provided by polymerizing the polymerizable compound contained in the liquid crystal composition by irradiation with ultraviolet light. The liquid crystal composition of the present invention is used in a liquid crystal display element in which the amount of transmitted light is controlled by using the birefringence of the liquid crystal composition. The liquid crystal composition of the present invention is useful for various liquid crystal display elements, such as an active-matrix liquid crystal display element (AM-LCD), a twisted nematic liquid crystal display element (TN-LCD), a super-twisted nematic liquid crystal display element (STN-LCD), an optically compensated birefringence liquid crystal display element (OCB-LCD), and an in-plane-switching liquid crystal display element (IPS-LCD). The liquid crystal composition of the present invention is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer can be produced by, for example, sputtering indium tin oxide (ITO) on a transparent substrate such as a glass plate.

A color filter can be produced by, for example, a pigment dispersion method, a printing method, an electrodeposition method, or a staining method. A method for producing a color filter will be described by taking the pigment dispersion method as an example. First, a curable coloring composition for a color filter is applied onto the above-mentioned transparent substrate, and is then patterned. The curable coloring composition is then cured by heating or light irradiation. These steps are performed for each of three colors of red, green, and blue. Thus, pixel portions of the color filter can be formed. Furthermore, pixel electrodes each including an active element such as a TFT, a thin-film diode, or a metal-insulator-metal specific resistance element may be provided on the substrate.

The substrates are arranged so as to face each other such that the transparent electrode layer is disposed inside. In this step, the gap between the substrates may be adjusted with a spacer therebetween. In this case, the gap is preferably adjusted so that the thickness of a light-modulating layer obtained is in the range of 1 to 100 μm, and more preferably 1.5 to 10 μm. When a polarizer is used, it is preferable to adjust the product of the birefringence Δn of the liquid crystal and a cell thickness d so that the maximum contrast is obtained. When two polarizers are provided, the polarizing axis of each of the polarizers may be adjusted so that a satisfactory angle of view and contrast can be obtained. Furthermore, a retardation film for widening the angle of view may also be used. Examples of the spacer include glass particles, plastic particles, alumina particles, and a photoresist material. Subsequently, a sealant such as an epoxy thermosetting composition or the like is applied onto the substrate by screen printing so as to form a liquid-crystal injection port. The substrates are then bonded to each other, and the sealant is thermally cured by heating.

As a method for interposing the polymerizable compound-containing liquid crystal composition between two substrates, a commonly used vacuum injection method, an ODF method, or the like can be employed. In the vacuum injection method, although a drop mark is not generated, this method has a problem in that a mark of injection is left. However, in the present invention, the liquid crystal composition can be suitably used in a display element produced by using the ODF method.

As a method for polymerizing the polymerizable compound, a method in which polymerization is conducted by irradiation with active energy rays such as ultraviolet light and an electron beam, which can be used alone, in combination, or sequentially, is preferable because a moderate rate of polymerization is desirable in order to obtain a good alignment performance of the liquid crystal. In the case where ultraviolet light is used, either a polarized light source or an unpolarized light source may be used. When polymerization is conducted in a state in which the polymerizable compound-containing liquid crystal composition is interposed between two substrates, it is necessary that at least a substrate on the irradiation surface side have transparency appropriate for the active energy rays. Only specific portions may be polymerized using a mask during light irradiation, and unpolymerized portions may then be polymerized by further irradiation with active energy rays while the alignment state of the unpolymerized portions is changed by changing a condition such as the electric field, the magnetic field, the temperature, or the like. In particular, when ultraviolet exposure is performed, the ultraviolet exposure is preferably performed while an alternating electric field is applied to the polymerizable compound-containing liquid crystal composition. Regarding the alternating electric field applied, an alternating current having a frequency of preferably 10 Hz to 10 kHz, and more preferably 60 Hz to 10 kHz is applied, and the voltage applied is selected in accordance with a desired pre-tilt angle of the liquid crystal display element. That is, the pre-tilt angle of the liquid crystal display element can be controlled by controlling the voltage applied. In a liquid crystal display element of the multi-domain vertical alignment (MVA) mode, it is preferable to control the pre-tilt angle to 80 to 89.9 degrees from the standpoint of alignment stability and the contrast.

The temperature during the irradiation is preferably within a temperature range in which the liquid crystal state of the liquid crystal composition of the present invention is maintained. Polymerization is preferably conducted at a temperature close to room temperature, that is, typically at a temperature in the range of 15° C. to 35° C. As a lamp for generating ultraviolet light, a metal halide lamp, a high-pressure mercury lamp, an ultrahigh-pressure mercury lamp, or the like can be used. As for the wavelength of ultraviolet light for irradiation, it is preferable to radiate ultraviolet light in a wavelength range which is not included in an absorption wavelength range of the liquid crystal composition. Preferably, part of ultraviolet light is cut off and used, as required. The intensity of ultraviolet light for irradiation is preferably 0.1 $mW/cm^2$ to 100 $W/cm^2$, and more preferably 2 $mW/cm^2$ to 50 $W/cm^2$. The amount of energy of the ultraviolet light for irradiation can be appropriately adjusted, and is preferably 10 $mJ/cm^2$ to 500 $J/cm^2$, and more preferably 100 $mJ/cm^2$ to 200 $J/cm^2$. During the irradiation of ultraviolet light, the intensity of the ultraviolet light may be changed. The ultraviolet-irradiation time is appropriately selected in accordance with the intensity of the ultraviolet light for irradiation, and is preferably 10 to 3,600 seconds and more preferably 10 to 600 seconds.

The liquid crystal display element using the liquid crystal composition of the present invention is a useful display element which realizes both high-speed response and suppression of display defects. The liquid crystal display element is particularly useful as a liquid crystal display element for active-matrix driving and can be applied to a liquid crystal display element for the VA mode, the PSVA mode, the PSA mode, the IPS mode, or the electrically controlled birefringence (ECB) mode.

EXAMPLES

The present invention will be described in more detail by way of Examples, but the present invention is not limited to these Examples. It should be noted that "%" in compositions of Examples and Comparative Examples described below represents "% by mass".

Characteristics measured in Examples are as follows:

$T_{ni}$: nematic phase-isotropic liquid phase transition temperature (° C.)

Δn: birefringence at 25° C.

Δ∈: dielectric anisotropy at 25° C.

η: viscosity at 20° C. (mPa·s)

$\gamma_1$: rotational viscosity at 25° C. (mPa·s)

VHR: voltage holding ratio (%) at 60° C. at a frequency of 60 Hz and an applied voltage of 1 V Image Sticking:

Image sticking of a liquid crystal display element was evaluated as follows. A predetermined fixed pattern was displayed in a display area for 1,000 hours, and a uniform image was then displayed on the full screen. The level of a residual image of the fixed pattern was evaluated by visual observation on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

Drop Mark:

A drop mark of a liquid crystal display element was evaluated as follows. When a black color was displayed on the full screen, a drop mark appearing as a white portion was evaluated by visual observation on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In the description of compounds in Examples, the abbreviations below are used.

(Side Shain)

-n: —$C_nH_{2n+1}$ linear alkyl group having a number of carbon atoms of n n-: $C_nH_{2n+1}$ linear alkyl group having a number of carbon atoms of n —$O_n$: —$OC_nH_{2n+1}$ linear alkoxy group having a number of carbon atoms of n

—V: —CH═$CH_2$

V—: $CH_2$═CH—

—V1: —CH═CH—$CH_3$ (Ring Structure)

[Chem. 12]

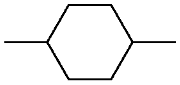

Cy

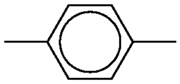

Ph

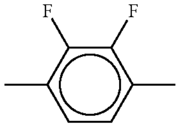

Ph5

-continued

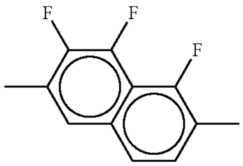

Nd4

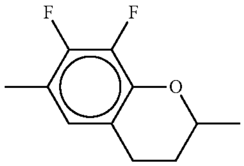

Ch3

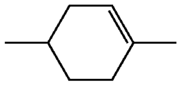

Cb

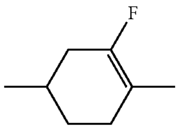

Cb1

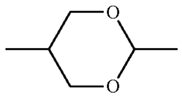

Oc

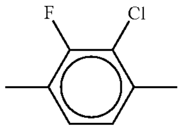

Ph15

Example 1

A liquid crystal composition LC-1 shown below was prepared.

[Chem. 13]

| Chemical structure | Ratio | Abbreviation |
|---|---|---|
| 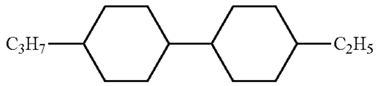 | 24% | 3-Cy—Cy-2 |
| 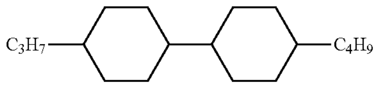 | 10% | 3-Cy—Cy-4 |
| 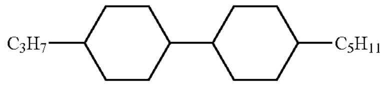 | 5% | 3-Cy—Cy-5 |

-continued
[Chem. 13]
| Chemical structure | Ratio | Abbreviation |
|---|---|---|
| 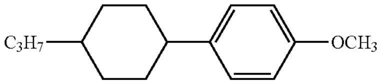 | 2% | 3-Cy—Ph—O1 |
| 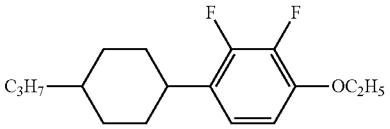 | 13% | 3-Cy—Ph5—O2 |
| 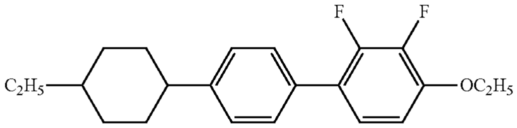 | 9% | 2-Cy—Ph—Ph5—O2 |
| 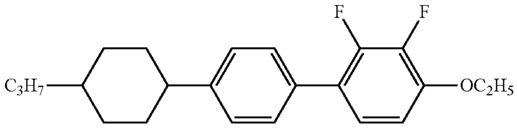 [SMILES: CCOc1ccc(-c2ccc(C3CCC(CC)CC3)cc2)c(F)c1F] | 9% | 3-Cy—Ph—Ph5—O2 |
| 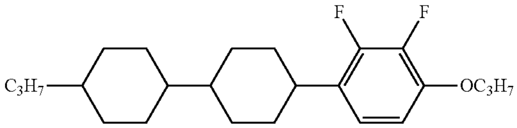 | 5% | 3-Cy—Cy—Ph5—O3 |
| 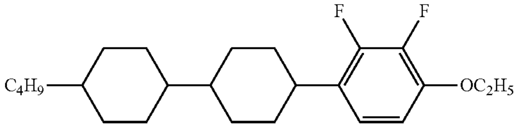 | 6% | 4-Cy—Cy—Ph5—O2 |
| 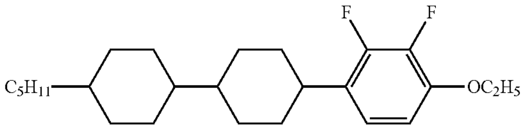 | 5% | 5-Cy—Cy—Ph5—O2 |
| 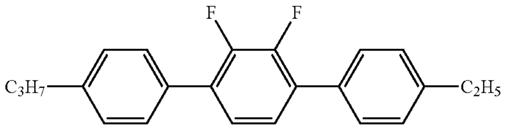 | 6% | 3-Ph—Ph5—Ph-2 |
| 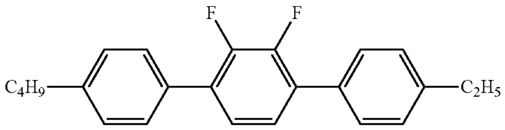 | 6% | 4-Ph—Ph5—Ph-2 |

The values of the physical properties of the liquid crystal composition LC-1 were as follows.

TABLE 1

| | |
|---|---|
| $T_{NI}$/° C. | 81.0 |
| $\Delta n$ | 0.103 |
| no | 1.483 |
| $\epsilon_{//}$ | 3.27 |
| $\epsilon_{\perp}$ | 6.18 |
| $\Delta\epsilon$ | −2.91 |
| $\eta$/mPa · s | 20.3 |
| $\gamma_1$/mPa · s | 112 |

A liquid crystal composition LCM-1 was prepared by adding 0.03% of a compound represented by formula (I-c-1):

[Chem. 14]

(I-c-1)

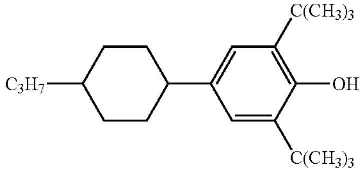

to 99.97% of the liquid crystal composition LC-1. The values of the physical properties of LCM-1 were substantially the same as those of LC-1. The initial VHR of the liquid crystal composition LCM-1 was 98.5%, and the VHR after the composition LCM-1 was left to stand at a high temperature of 150° C. for one hour was 98.5%. A vertical alignment (VA) liquid crystal display element was prepared by using the liquid crystal composition LCM-1, and image sticking and a drop mark of the liquid crystal display element were evaluated by the methods described above. Good results were obtained as shown below.

TABLE 2

| | |
|---|---|
| Evaluation of drop mark | A |
| Evaluation of image sticking | A |

Furthermore, a response speed was measured using a cell with ITO, the cell having a cell gap of 3.5 μm and including polyimide alignment layers that induced homeotropic alignment. The response speed was 4.5 ms.

Comparative Example 1

The liquid crystal composition LC-1, to which the compound represented by formula (I-c-1) described in Example 1 was not added, had an initial VHR of 98.5%. In contrast, the VHR after the composition LC-1 was left to stand at a high temperature of 150° C. for one hour was 86.1%, which was significantly decreased from the initial VHR.

A VA liquid crystal display element was prepared by using the liquid crystal composition LC-1, and image sticking and a drop mark of the liquid crystal display element were evaluated by the methods described above. Results inferior to those of Example 1 were obtained as shown below.

TABLE 3

| | |
|---|---|
| Evaluation of drop mark | C |
| Evaluation of image sticking | D |

Comparative Example 2

A liquid crystal composition LC-2 that did not contain a compound represented by general formula (II), the composition LC-2 being shown below, was prepared.

[Chem. 15]

| Chemical structure | Ratio | Abbreviation |
|---|---|---|
| 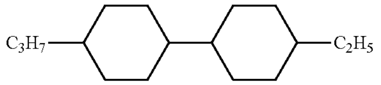 | 15% | 3-Cy—Cy-2 |
| 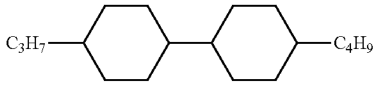 | 12% | 3-Cy—Cy-4 |
| 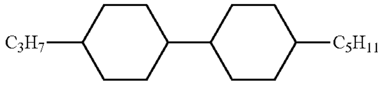 | 5% | 3-Cy—Cy-5 |
| 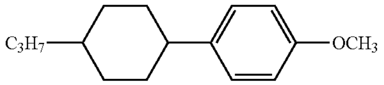 | 5% | 3-Cy—Ph—O1 |
| 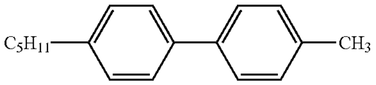 | 7% | 5-Ph—Ph-1 |
| 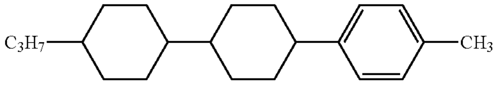 | 4% | 3-Cy—Cy—Ph-1 |

-continued

[Chem. 15]

| Chemical structure | Ratio | Abbreviation |
|---|---|---|
| 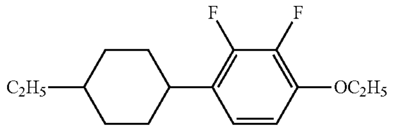 | 6% | 2-Cy—Ph5—O2 |
| 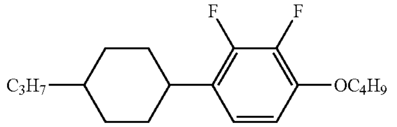 | 6% | 3-Cy—Ph5—O4 |
| 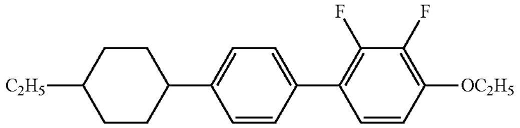 [SMILES: CCOc1ccc(-c2ccc(C3CCC(CC)CC3)cc2)c(F)c1F] | 12% | 2-Cy—Ph—Ph5—O2 |
| 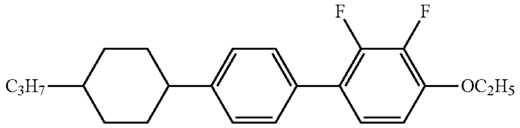 | 12% | 3-Cy—Ph—Ph5—O2 |
| 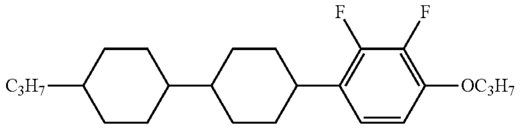 | 5% | 3-Cy—Cy—Ph5—O3 |
| 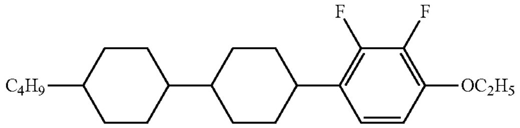 | 6% | 4-Cy—Cy—Ph5—O2 |
| 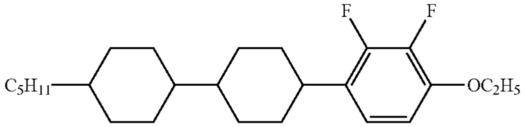 | 5% | 5-Cy—Cy—Ph5—O2 |

The values of the physical properties of the liquid crystal composition LC-2 were as follows.

TABLE 4

| | |
|---|---|
| $T_{NI}$/° C. | 81.4 |
| Δn | 0.101 |
| no | 1.484 |
| $\epsilon_{//}$ | 3.23 |
| $\epsilon_{\perp}$ | 6.09 |
| Δε | −2.86 |
| η/mPa · s | 22.6 |
| $\gamma_1$/mPa · s | 122 |

A liquid crystal composition LCM-2 was prepared by adding 0.03% of the compound represented by formula (I-c-1) to 99.97% of the liquid crystal composition LC-2. The values of the physical properties of LCM-2 were substantially the same as those of LC-2. The results showed that the viscosity η and the rotational viscosity $\gamma_1$ of the liquid crystal composition LC-2, which did not contain a compound represented by general formula (II), were significantly, namely, about 10%, higher than those of the liquid crystal composition LCM-1, which contained a compound represented by general formula (II). The initial VHR of the liquid crystal composition LCM-2 was 98.3%, whereas the VHR after the composition LCM-2 was left to stand at a high temperature of 150° C. for one hour was 97.4%.

A VA liquid crystal display element was prepared by using the liquid crystal composition LCM-2, and image sticking and a drop mark of the liquid crystal display element were evaluated by the methods described above. Results inferior to those of Example 1 were obtained as shown below.

TABLE 5

| | |
|---|---|
| Evaluation of drop mark | C |
| Evaluation of image sticking | B |

A response speed was measured using a cell with ITO, the cell having a cell gap of 3.5 μm and including polyimide alignment layers that induced homeotropic alignment. The response speed was 5.3 ms, which was inferior to that of LCM-1 described in Example 1.

Examples 2 to 4

Liquid crystal compositions LC-3 to LC-5 shown below were prepared, and the values of the physical properties of LC-3 to LC-5 were measured. The results are shown in the table below.

TABLE 6

| Example 2<br>Liquid crystal composition LC-3 | |
|---|---|
| $T_{NI}$/° C. | 76.0 |
| Δn | 0.103 |
| no | 1.484 |
| $\epsilon_{//}$ | 3.34 |
| $\epsilon_{\perp}$ | 6.25 |
| Δϵ | −2.91 |
| η/mPa · s | 19.8 |
| $\gamma_1$/mPa · s | 110 |
| 3-Cy—Cy-2 | 24% |
| 3-Cy—Cy-4 | 10% |
| 3-Cy—Ph—O1 | 7% |
| 3-Cy—Ph5—O2 | 14% |
| 2-Cy—Ph—Ph5—O2 | 7% |
| 3-Cy—Ph—Ph5—O2 | 9% |
| 3-Cy—Cy—Ph5—O3 | 5% |
| 4-Cy—Cy—Ph5—O2 | 7% |
| 5-Cy—Cy—Ph5—O2 | 5% |
| 3-Ph—Ph5—Ph-2 | 6% |
| 4-Ph—Ph5—Ph-2 | 6% |
| **Example 3<br>Liquid crystal composition LC-4** | |
| $T_{NI}$/° C. | 74.9 |
| Δn | 0.102 |
| no | 1.484 |
| $\epsilon_{//}$ | 3.23 |
| $\epsilon_{\perp}$ | 6.09 |
| Δϵ | −2.86 |
| η/mPa · s | 21.1 |
| $\gamma_1$/mPa · s | 116 |
| 3-Cy—Cy-2 | 22% |
| 3-Cy—Cy-4 | 11% |
| 5-Ph—Ph-1 | 8% |
| 3-Cy—Cy—Ph-1 | 2% |
| 3-Cy—Ph5—O2 | 7% |
| 3-Cy—Ph5—O4 | 8% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 7% |
| 5-Cy—Cy—Ph5—O2 | 7% |
| 3-Ph—Ph5—Ph-2 | 4% |
| 4-Ph—Ph5—Ph-2 | 4% |
| **Example 4<br>Liquid crystal composition LC-5** | |
| $T_{NI}$/° C. | 76.9 |
| Δn | 0.117 |
| no | 1.489 |
| $\epsilon_{//}$ | 3.20 |
| $\epsilon_{\perp}$ | 6.22 |
| Δϵ | −3.02 |
| η/mPa · s | 20.5 |
| $\gamma_1$/mPa · s | 116 |
| 5-Ph—Ph-1 | 13% |
| 3-Cy—Cy—V | 18% |
| 3-Cy—Cy—V1 | 7% |
| V—Cy—Cy—Ph-1 | 5% |
| 3-Cy—Ph5—O2 | 7% |
| 3-Cy—Ph5—O4 | 8% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 7% |

TABLE 6-continued

| | |
|---|---|
| 5-Cy—Cy—Ph5—O2 | 7% |
| 3-Ph—Ph5—Ph-2 | 4% |
| 4-Ph—Ph5—Ph-2 | 4% |

Liquid crystal compositions LCM-3 to LCM-5 were respectively prepared by adding 0.03% of the compound represented by formula (I-c-1) to 99.97% of the liquid crystal compositions LC-3 to LC-5. The values of the physical properties of LCM-3 to LCM-5 were substantially the same as those before the addition of the compound.

The initial VHR of each of the liquid crystal compositions LCM-3 to LCM-5 was substantially the same as the VHR after the composition was left to stand at a high temperature of 150° C. for one hour. VA liquid crystal display elements were prepared by using the liquid crystal compositions LCM-3 to LCM-5, and image sticking and a drop mark of each of the liquid crystal display elements were evaluated. Good results were obtained as shown below.

TABLE 7

| | LCM-3 | LCM-4 | LCM-5 |
|---|---|---|---|
| Initial VHR (%) | 98.4 | 98.2 | 98.5 |
| VHR (%) after 1 hour at 150° C. | 98.1 | 98.2 | 98.1 |
| Evaluation of drop mark | A | A | A |
| Evaluation of image sticking | A | A | A |

Examples 5 to 7

Liquid crystal compositions LC-6 to LC-8 shown below were prepared, and the values of the physical properties of LC-6 to LC-8 were measured. The results are shown in the table below.

TABLE 8

| Example 5<br>Liquid crystal composition LC-6 | |
|---|---|
| $T_{NI}$/° C. | 80.1 |
| Δn | 0.093 |
| no | 1.479 |
| $\epsilon_{//}$ | 3.14 |
| $\epsilon_{\perp}$ | 6.09 |
| Δϵ | −2.95 |
| η/mPa · s | 19.0 |
| $\gamma_1$/mPa · s | 96 |
| 3-Cy—Cy-2 | 23% |
| 3-Cy—Cy-4 | 6% |
| 3-Cy—Cy—V | 9% |
| 3-Cy—Cy—V1 | 5% |
| 3-Cy—Ph5—O2 | 7% |
| 3-Cy—Ph5—O4 | 7% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 4% |
| 4-Ph—Ph5—Ph-2 | 4% |
| **Example 6<br>Liquid crystal composition LC-7** | |
| $T_{NI}$/° C. | 80.4 |
| Δn | 0.113 |
| no | 1.487 |
| $\epsilon_{//}$ | 3.19 |
| $\epsilon_{\perp}$ | 6.18 |
| Δϵ | −2.99 |
| η/mPa · s | 20.2 |
| $\gamma_1$/mPa · s | 107 |

TABLE 8-continued

| | |
|---|---|
| 5-Ph—Ph-1 | 10% |
| 3-Cy—Cy—V | 20% |
| 3-Cy—Cy—V1 | 9% |
| V-Cy—Cy—Ph-1 | 4% |
| 3-Cy—Ph5—O2 | 7% |
| 3-Cy—Ph5—O4 | 7% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 4% |
| 4-Ph—Ph5—Ph-2 | 4% |

| Example 7<br>Liquid crystal composition LC-8 | |
|---|---|
| $T_{NI}$/° C. | 80.2 |
| Δn | 0.1119 |
| no | 1.4850 |
| $\epsilon_{//}$ | 3.30 |
| $\epsilon_{\perp}$ | 6.24 |
| $\Delta\epsilon$ | −2.94 |
| η/mPa · s | 18.7 |
| $\gamma_1$/mPa · s | 108 |
| 3CyPhO1 | 4% |
| 3-Cy—Cy—V | 25% |
| 3-Cy—Cy—V1 | 10% |
| 2-Cy—Ph5—O2 | 7% |
| 3-Cy—Ph5—O4 | 8% |
| 2-Cy—Ph—Ph5—O2 | 5% |
| 3-Cy—Ph—Ph5—O2 | 6% |
| 3-Cy—Cy—Ph5—O3 | 6% |
| 4-Cy—Cy—Ph5—O2 | 7% |
| 5-Cy—Cy—Ph5—O2 | 6% |
| 3-Ph—Ph5—Ph-2 | 8% |
| 4-Ph—Ph5—Ph-2 | 8% |

Liquid crystal compositions LCM-6 to LCM-8 were respectively prepared by adding 0.03% of the compound represented by formula (I-c-1) to 99.97% of the liquid crystal compositions LC-6 to LC-8. The values of the physical properties of LCM-6 to LCM-8 were substantially the same as those before the addition of the compound.

The initial VHR of each of the liquid crystal compositions LCM-6 to LCM-8 was substantially the same as the VHR after the composition was left to stand at a high temperature of 150° C. for one hour. VA liquid crystal display elements were prepared by using the liquid crystal compositions LCM-6 to LCM-8, and image sticking and a drop mark of each of the liquid crystal display elements were evaluated. Good results were obtained as shown below.

TABLE 9

| | LCM-6 | LCM-7 | LCM-8 |
|---|---|---|---|
| Initial VHR (%) | 98.3 | 98.5 | 98.4 |
| VHR (%) after 1 hour at 150° C. | 98.2 | 98.1 | 98.1 |
| Evaluation of drop mark | A | A | A |
| Evaluation of image sticking | A | A | A |

Examples 8 and 9

Liquid crystal compositions LC-9 and LC-10 shown below were prepared, and the values of the physical properties of LC-9 and LC-10 were measured. The results are shown in the table below.

TABLE 10

| Example 8<br>Liquid crystal composition LC-9 | |
|---|---|
| $T_{NI}$/° C. | 75.3 |
| Δn | 0.097 |
| no | 1.481 |
| $\epsilon_{//}$ | 3.15 |
| $\epsilon_{\perp}$ | 6.14 |
| $\Delta\epsilon$ | −2.99 |
| η/mPa · s | 18.1 |
| $\gamma_1$/mPa · s | 101 |
| 6-Cy—Cy-2 | 22% |
| 5-Ph—Ph-1 | 3% |
| 3-Cy—Cy—V | 12% |
| 3-Cy—Cy—V1 | 6% |
| 3-Cy—Ph5—O2 | 7% |
| 3-Cy—Ph5—O4 | 8% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 7% |
| 5-Cy—Cy—Ph5—O2 | 7% |
| 3-Ph—Ph5—Ph-2 | 4% |
| 4-Ph—Ph5—Ph-2 | 4% |

| Example 9<br>Liquid crystal composition LC-10 | |
|---|---|
| $T_{NI}$/° C. | 81.1 |
| Δn | 0.105 |
| no | 1.484 |
| $\epsilon_{//}$ | 3.28 |
| $\epsilon_{\perp}$ | 6.11 |
| $\Delta\epsilon$ | −2.83 |
| η/mPa · s | 20.8 |
| $\gamma_1$/mPa · s | 119 |
| 3-Cy—Cy-2 | 25% |
| 3-Cy—Cy-4 | 10% |
| 3-Cy—Ph—O1 | 4% |
| 2-Cy—Ph5—O2 | 12% |
| 2-Cy—Ph—Ph5—O2 | 5% |
| 3-Cy—Ph—Ph5—O2 | 6% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 8% |
| 4-Ph—Ph5—Ph-2 | 8% |

Liquid crystal compositions LCM-9 and LCM-10 were respectively prepared by adding 0.03% of a compound represented by formula (I-a-1):

[Chem. 16]

(I-a-1)

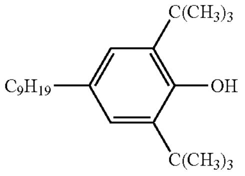

to 99.97% of the liquid crystal compositions LC-9 and LC-10. The values of the physical properties of LCM-9 and LCM-10 were substantially the same as those before the addition of the compound.

The initial VHR of each of the liquid crystal compositions LCM-9 and LCM-10 was substantially the same as the VHR after the composition was left to stand at a high temperature of 150° C. for one hour. VA liquid crystal display elements were prepared by using the liquid crystal compositions LCM-9 and LCM-10, and image sticking and a drop mark of each of the liquid crystal display elements were evaluated. Good results were obtained as shown below.

TABLE 11

| | LCM-9 | LCM-10 |
|---|---|---|
| Initial VHR (%) | 97.9 | 97.6 |
| VHR (%) after 1 hour at 150° C. | 97.5 | 97.3 |
| Evaluation of drop mark | A | A |
| Evaluation of image sticking | A | A |

Example 10

A polymerizable liquid crystal composition CLCM-1 was prepared by adding 0.3% of a polymerizable compound represented by a formula:

[Chem. 17]

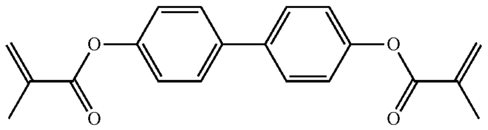

to 99.7% of the liquid crystal composition LCM-1 described in Example 1, and uniformly dissolving the polymerizable compound. This polymerizable liquid crystal composition was injected, by a vacuum injection method, into a cell with ITO, the cell having a cell gap of 3.5 μm and including polyimide alignment layers that induced homeotropic alignment. After the injection, the liquid crystal cell was irradiated for 600 seconds using a high-pressure mercury lamp having a peak wavelength of 300 to 400 nm while the irradiation intensity on the surface of the cell was adjusted to 10 $mW/cm^2$ in a state where a voltage was applied, thus fabricating a vertical-alignment liquid crystal display element in which the polymerizable compound in the polymerizable liquid crystal composition was polymerized. Image sticking and a drop mark of the liquid crystal display element were evaluated. Good results were obtained as shown below.

TABLE 12

| | |
|---|---|
| Evaluation of drop mark | A |
| Evaluation of image sticking | A |

Comparative Examples 3 and 4

Polymerizable liquid crystal compositions CLCM-2 and CLCM-3 were respectively prepared by adding 0.3% of a polymerizable compound represented by a formula:

[Chem. 18]

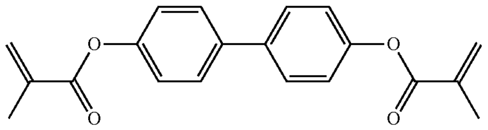

to 99.7% of the liquid crystal composition LC-1 used in Comparative Example 1 and the liquid crystal composition LCM-2 used in Comparative Example 2, and uniformly dissolving the polymerizable compound. Each of these polymerizable liquid crystal compositions was injected, by a vacuum injection method, into a cell with ITO, the cell having a cell gap of 3.5 μm and including polyimide alignment layers that induced homeotropic alignment. After the injection, each of the liquid crystal cells was irradiated for 600 seconds using a high-pressure mercury lamp having a peak wavelength of 300 to 400 nm while the irradiation intensity on the surface of the cell was adjusted to 10 $mW/cm^2$ in a state where a voltage was applied, thus fabricating vertical-alignment liquid crystal display elements in which the polymerizable compound in the polymerizable liquid crystal compositions was polymerized. Image sticking and a drop mark of the liquid crystal display elements were evaluated. Results inferior to those of Example 10 were obtained as shown below.

TABLE 13

| | Element prepared using CLCM-2 | Element prepared using CLCM-3 |
|---|---|---|
| Evaluation of drop mark | D | D |
| Evaluation of image sticking | D | C |

Examples 11 to 13

Polymerizable liquid crystal compositions CLCM-4, CLCM-5, and CLCM-6 were respectively prepared by adding 0.3% of a polymerizable compound represented by a formula:

[Chem. 19]

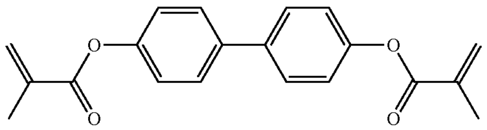

to 99.7% of the liquid crystal compositions LCM-6, LCM-7, and LCM-8 respectively described in Examples 5, 6 and 7, and uniformly dissolving the polymerizable compound. Each of these polymerizable liquid crystal compositions was injected, by a vacuum injection method, into a cell with ITO, the cell having a cell gap of 3.5 μm and including polyimide alignment layers that induced homeotropic alignment. After the injection, each of the liquid crystal cells was irradiated for 600 seconds using a high-pressure mercury lamp having a peak wavelength of 300 to 400 nm while the irradiation intensity on the surface of the cell was adjusted to 10 $mW/cm^2$ in a state where a voltage was applied, thus fabricating vertical-alignment liquid crystal display elements in which the polymerizable compound in the polymerizable liquid crystal compositions was polymerized.

TABLE 14

| | Element prepared using CLCM-4 | Element prepared using CLCM-5 | Element prepared using CLCM-6 |
|---|---|---|---|
| Evaluation of drop mark | A | A | A |
| Evaluation of image sticking | A | A | A |

Image sticking and a drop mark of each of the liquid crystal display elements were evaluated. Good results were obtained as shown above.

The invention claimed is:

1. A nematic liquid crystal composition comprising:

as a first component, at least one compound represented by general formula (I):

[Chem. 1]

(I)

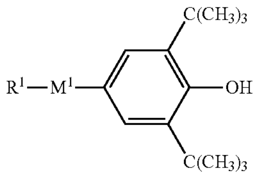

(where $R^1$ represents a linear or branched alkyl group having 1 to 22 carbon atoms and one $CH_2$ group in the alkyl group may be substituted with —O—; and $M^1$ represents a trans-1,4-cyclohexylene group, or a single bond); and, as a second component, at least one compound selected from the group consisting of compounds represented by general formula (II):

[Chem. 2]

(II)

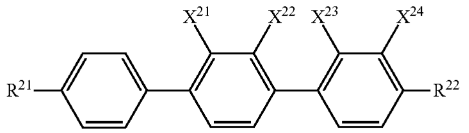

(where $R^{21}$ and $R^{22}$ each independently represent an alkyl group having 1 to 10 carbon atoms or an alkenyl group having 2 to 10 carbon atoms and $X^{21}$ to $X^{24}$ each independently represent a hydrogen atom or a fluorine atom), wherein a dielectric anisotropy (Δ∈) at 25° C. is −2.0 or less.

2. The nematic liquid crystal composition according to claim 1, further comprising, as a third component, at least one compound represented by general formula (III):

[Chem. 3]

(III)

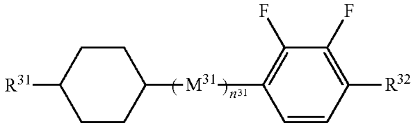

(where $R^{31}$ and $R^{32}$ each independently represent an alkyl group or alkoxy group having 1 to 10 carbon atoms, or an alkenyl group having 2 to 10 carbon atoms; $M^{31}$ represents a trans-1,4-cyclohexylene group or a 1,4-phenylene group, one or two —$CH_2$— groups in the trans-1,4-cyclohexylene group may be substituted with —O— so that oxygen atoms are not directly adjacent to each other, and one or two hydrogen atoms in the phenylene group may be substituted with a fluorine atom; and $n^{31}$ represents 0 or 1).

3. The liquid crystal composition according to claim 1 or 2, further comprising at least one compound selected from the compound group represented by general formulae (IV-a) to (IV-d):

[Chem. 4]

(IV-a)

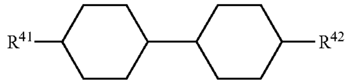

(IV-b)

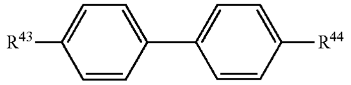

(IV-c)

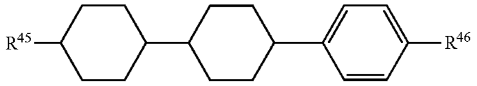

(IV-d)

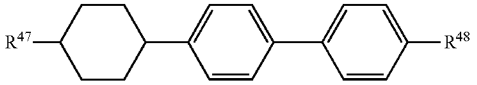

(where $R^{41}$ to $R^{48}$ each independently represent an alkyl group or alkoxy group having 1 to 10 carbon atoms, or an alkenyl group having 2 to 10 carbon atoms).

4. The nematic liquid crystal composition according to claim 3 wherein, in general formula (I), $R^1$ represents a linear or branched alkyl group having 1 to 10 carbon atoms and $M^1$ represents a trans-1,4-cyclohexylene group.

5. The nematic liquid crystal composition according to claim 4, wherein the content of the at least one compound represented by general formula (I) is 0.001% to 1% by mass, and the content of the at least one compound represented by general formula (II) is 5% to 30% by mass.

6. The nematic liquid crystal composition according to claim 5, further comprising a polymerizable compound represented by general formula (V):

[Chem. 5]

(V)

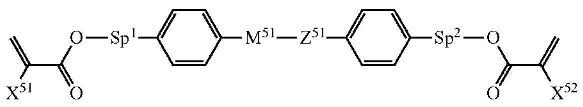

(where $X^{51}$ and $X^{52}$ each independently represent a hydrogen atom or a methyl group;

$Sp^1$ and $Sp^2$ each independently represent a single bond, an alkylene group having 1 to 8 carbon atoms, or —O—$(CH_2)_s$—

(where s represents an integer of 2 to 7 and the oxygen atom is bonded to an aromatic ring);

$Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$═$CY^2$— (where $Y^1$ and $Y^2$ each independently represent a fluorine atom or a hydrogen atom), —C≡C—, or a single bond; and $M^{51}$ represents a 1,4-phenylene group, a trans-1,4-cyclohexylene group, or a single bond, and any hydrogen atom in all the 1,4-phenylene groups in the formula may be substituted with a fluorine atom).

7. A liquid crystal display element comprising a first substrate having a common electrode composed of a transparent conductive material; a second substrate having pixel electrodes composed of a transparent conductive material and thin-film transistors that control the pixel electrodes provided for respective pixels; and a liquid crystal composition sandwiched between the first substrate and the second substrate, the liquid crystal composition including liquid crystal molecules that are aligned substantially perpendicularly to the substrates when no voltage is applied, wherein the nematic liquid crystal composition according to claim 6 is used as the liquid crystal composition.

8. A polymer-stabilized mode liquid crystal display element produced by using the nematic liquid crystal composition according to claim 6, the liquid crystal composition containing a polymerizable compound, and polymerizing the polymerizable compound contained in the liquid crystal composition with or without application of a voltage.

* * * * *